United States Patent
Lee et al.

(10) Patent No.: US 11,983,347 B2
(45) Date of Patent: May 14, 2024

(54) TOUCH DISPLAY DEVICE, METHOD FOR DRIVING THE SAME, DRIVING CIRCUIT, DATA-DRIVING CIRCUIT, AND GATE-DRIVING CIRCUIT

(71) Applicant: LG Display Co., Ltd., Seoul (KR)

(72) Inventors: HongJu Lee, Paju-si (KR); HyeongWon Kang, Seoul (KR); Youngwoo Jo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/189,067

(22) Filed: Mar. 23, 2023

(65) Prior Publication Data

US 2023/0229251 A1     Jul. 20, 2023

Related U.S. Application Data

(63) Continuation of application No. 17/354,885, filed on Jun. 22, 2021, now Pat. No. 11,620,010, which is a (Continued)

(30) Foreign Application Priority Data

Oct. 13, 2016 (KR) ......................... 10-2016-0133165

(51) Int. Cl.
  *G06F 3/044* (2006.01)
  *G02F 1/1333* (2006.01)
  (Continued)

(52) U.S. Cl.
  CPC ........ *G06F 3/0412* (2013.01); *G02F 1/13338* (2013.01); *G02F 1/134309* (2013.01); (Continued)

(58) Field of Classification Search
  CPC ...... G06F 3/0412; G06F 3/0418; G06F 3/044; G06F 2203/04112; G06F 3/0443;
  (Continued)

(56) References Cited

U.S. PATENT DOCUMENTS 7,633,481 B2   12/2009  Kim et al.
8,253,679 B2    8/2012  Kim et al.
(Continued)

FOREIGN PATENT DOCUMENTS

CN         1848226 A    10/2006
CN       101877212 A    11/2010
(Continued)

OTHER PUBLICATIONS

United States Office Action, U.S. Appl. No. 15/722,994, Mar. 18, 2019, 118 pages.
(Continued)

*Primary Examiner* — Abdul-Samad A Adediran
(74) *Attorney, Agent, or Firm* — Fenwick & West LLP

(57) ABSTRACT

The present embodiments may provide a touch display device including: a display panel in which a plurality of data lines, a plurality of gate lines, and a plurality of touch electrodes are disposed; a gate-driving circuit configured to drive the plurality of gate lines; a data-driving circuit configured to drive the plurality of data lines; and a touch-driving circuit configured to drive the plurality of touch electrodes while the plurality of data lines and the plurality of gate lines are driven. In this touch display device, while a touch-driving signal swings with a predetermined amplitude, a data signal and a gate signal may also swing with the predetermined amplitude. According to the present embodiments, it is possible to enable high-speed image display and high-speed touch sensing, to perform a display operation
(Continued)

and a touch operation simultaneously, and to display an image normally without any image change.

17 Claims, 14 Drawing Sheets

Related U.S. Application Data continuation of application No. 16/657,338, filed on Oct. 18, 2019, now Pat. No. 11,068,094, which is a continuation of application No. 15/722,994, filed on Oct. 2, 2017, now Pat. No. 10,488,964.

(51) Int. Cl.
*G02F 1/1343* (2006.01)
*G02F 1/1362* (2006.01)
*G06F 3/041* (2006.01)
*G09G 3/36* (2006.01)

(52) U.S. Cl.
CPC ...... *G02F 1/136286* (2013.01); *G06F 3/0418* (2013.01); *G06F 3/044* (2013.01); *G09G 3/3677* (2013.01); *G09G 3/3688* (2013.01); *G02F 2201/121* (2013.01); *G02F 2201/123* (2013.01); *G06F 2203/04112* (2013.01); *G09G 2310/027* (2013.01); *G09G 2310/0286* (2013.01); *G09G 2310/0289* (2013.01); *G09G 2310/0291* (2013.01)

(58) Field of Classification Search
CPC ........... G02F 1/13338; G02F 1/134309; G02F 1/136286; G02F 2201/121; G02F 2201/123; G09G 3/3677; G09G 3/3688; G09G 2310/027; G09G 2310/0286; G09G 2310/0289; G09G 2310/0291
USPC .................................................. 345/98, 173
See application file for complete search history.

(56) References Cited

U.S. PATENT DOCUMENTS

| | | | |
|---|---|---|---|
| 8,390,554 B2 | 3/2013 | Cho et al. |
| 8,749,515 B2 | 6/2014 | Kim et al. |
| 8,933,898 B2 | 1/2015 | Lee et al. |
| 8,970,524 B2 | 3/2015 | Kim et al. |
| 9,201,261 B2 | 12/2015 | Kim et al. |
| 9,250,756 B2 | 2/2016 | Kim et al. |
| 9,335,852 B2 | 5/2016 | Lee et al. |
| 9,372,583 B2 | 6/2016 | Kim et al. |
| 9,430,088 B1 | 8/2016 | Lee et al. |
| 9,459,717 B2 | 10/2016 | Lee et al. |
| 9,606,655 B2 | 3/2017 | Choo et al. |
| 10,001,886 B2 | 6/2018 | Han et al. |
| 2006/0227095 A1 | 10/2006 | Kim et al. |
| 2010/0060619 A1 | 3/2010 | Kim et al. |
| 2010/0277494 A1 | 11/2010 | Cho et al. |
| 2011/0316809 A1 | 12/2011 | Kim et al. |
| 2012/0056835 A1 | 3/2012 | Choo et al. |
| 2012/0249444 A1 | 10/2012 | Lee et al. |
| 2013/0033439 A1 | 2/2013 | Kim et al. |
| 2014/0049508 A1 | 2/2014 | Kim et al. |
| 2014/0168538 A1 | 6/2014 | Kim et al. |
| 2014/0248732 A1 | 9/2014 | Kim et al. |
| 2014/0253493 A1 | 9/2014 | Cho |
| 2015/0103038 A1* | 4/2015 | Han ...................... G06F 3/0443 345/98 |
| 2015/0268745 A1 | 9/2015 | Li et al. |
| 2016/0018916 A1 | 1/2016 | Lee et al. |
| 2016/0019827 A1 | 1/2016 | Lee et al. |
| 2016/0098959 A1 | 4/2016 | Moon et al. |
| 2017/0177154 A1 | 6/2017 | Choo et al. |
| 2018/0024677 A1* | 1/2018 | Kim ...................... G06F 3/0412 345/173 |

FOREIGN PATENT DOCUMENTS

| | | |
|---|---|---|
| CN | 102298473 A | 12/2011 |
| CN | 102402330 A | 4/2012 |
| CN | 102736291 A | 10/2012 |
| CN | 102914893 A | 2/2013 |
| CN | 103594050 A | 2/2014 |
| CN | 103870083 A | 6/2014 |
| CN | 104575413 A | 4/2015 |
| CN | 104575435 A | 4/2015 |
| CN | 105243993 A | 1/2016 |
| CN | 105260067 A | 1/2016 |
| CN | 105912178 A | 8/2016 |
| EP | 2267791 A2 | 12/2010 |
| EP | 2975498 A1 | 1/2016 |
| TW | 201322071 A1 | 6/2013 |

OTHER PUBLICATIONS

United States Office Action, U.S. Appl. No. 15/722,994, Dec. 4, 2018, 95 pages.
United States Office Action, U.S. Appl. No. 16/657,338, Sep. 25, 2020, 75 pages.
United States Office Action, U.S. Appl. No. 17/354,885, Aug. 12, 2022, 12 pages.

* cited by examiner

TOUCH DISPLAY DEVICE, METHOD FOR DRIVING THE SAME, DRIVING CIRCUIT, DATA-DRIVING CIRCUIT, AND GATE-DRIVING CIRCUIT

CROSS REFERENCE TO RELATED APPLICATION

This application is a continuation of U.S. patent application Ser. No. 17/354,885 filed on Jun. 22, 2021, which is a continuation of U.S. patent application Ser. No. 16/657,338, filed on Oct. 18, 2019 (now U.S. Pat. No. 11,068,094 issued on Jul. 20, 2021), which is a continuation of U.S. patent application Ser. No. 15/722,994, filed on Oct. 2, 2017 (now U.S. Pat. No. 10,488,964 issued on Nov. 26, 2019), which claims priority from Republic of Korea Patent Application No. 10-2016-0133165, filed on Oct. 13, 2016, all of which are hereby incorporated by reference for its entirety.

BACKGROUND OF THE INVENTION

1. Field of Technology

This disclosure relates to a touch display device, a method for driving the same, a driving circuit, a data-driving circuit, and a gate-driving circuit.

2. Description of the Prior Art

With the development of the information-oriented society, there is growing demand for touch display devices for displaying images in various forms, and accordingly, different types of display devices, such as a liquid crystal display (LCD) device, a plasma display panel (PDP), and an organic light-emitting display device (OLED), have been used in recent years.

A display device provides a touch-based input mode that enables a user to easily, intuitively, and conveniently input information or commands, representing a departure from a conventional input mode using buttons, keyboard, and mouse.

To provide the touch-based input mode, it is necessary to recognize whether a user performs a touch and to accurately detect the coordinates of the touch.

To this end, a touch-enabled display device is conventionally provided using one of various touch modes including a resistive mode, a capacitive mode, an electromagnetic induction mode, an infrared mode, and an ultrasonic mode.

Among these various types of touch modes, a capacitive touch mode is frequently adopted, which detects the occurrence of a touch and the coordinates of a touch based on a change in capacitance between touch electrodes or a change in capacitance between a touch electrode and a pointer, such as a finger, through a plurality of touch electrodes formed on a touch screen panel.

Meanwhile, attempts have been made to embed a touch screen panel including touch electrodes in a display panel in order to improve convenience of manufacturing a display device and reducing the size of a display device.

A conventional touch-sensing-enabled display device performs a display function for image display and a touch function for touch sensing at different times.

When the display function and the touch function are performed at different times, it may be difficult to completely and quickly perform the display function or to completely and quickly perform the touch function. That is, high-speed image display and high-speed touch sensing may not be achieved.

SUMMARY

An aspect of the present embodiments is to provide a touch display device, a method for driving the same, a driving circuit, a data-driving circuit, and a gate-driving circuit which enable high-speed image display and high-speed touch sensing.

Another aspect of the present embodiments is to provide a touch display device, a method for driving the same, a driving circuit, a data-driving circuit, and a gate-driving circuit which enable a display operation and a touch operation to be performed simultaneously.

Still another aspect of the present embodiments is to provide a touch display device, a method for driving the same, a driving circuit, a data-driving circuit, and a gate-driving circuit which enable an image to be displayed normally without any change in the image, while performing a display operation and a touch operation simultaneously.

In accordance with an aspect, the present embodiments may provide a touch display device including: a display panel in which a plurality of data lines, a plurality of gate lines, and a plurality of touch electrodes are disposed; a gate-driving circuit configured to output a gate signal for driving the plurality of gate lines; a data-driving circuit configured to output a data signal for driving the plurality of data lines; and a touch-driving circuit configured to output a touch-driving signal in order to drive the plurality of touch electrodes while the plurality of data lines and the plurality of gate lines are driven.

In the touch display device, the touch-driving circuit may output a touch-driving signal swinging with a predetermined amplitude.

In the touch display device, the gate-driving circuit may output a gate signal having a voltage changed by the amplitude of the touch-driving signal during a high-level period of the touch-driving signal.

In the touch display device, the data-driving circuit may output a data signal having a voltage changed by the amplitude of the touch-driving signal during a high-level period of the touch-driving signal.

In accordance with another aspect, the present embodiments may provide a method for driving a touch display device including a display panel in which a plurality of data lines, a plurality of gate lines, and a plurality of touch electrodes are disposed, a gate-driving circuit configured to drive the plurality of gate lines, and a data-driving circuit configured to drive the plurality of data lines.

The method for driving the touch display device may include: outputting a touch-driving signal in order to drive the plurality of touch electrodes while the plurality of data lines and the plurality of gate lines are driven; and detecting occurrence of a touch or coordinates of a touch based on a signal received through each touch electrode.

In the outputting the touch-driving signal, the touch-driving signal may swing with a predetermined amplitude. During a high-level period of the touch-driving signal, a gate signal to drive the gate lines may have a voltage changed by the amplitude of the touch-driving signal, and a data signal to drive the data lines may have a voltage changed by the amplitude of the touch-driving signal.

In accordance with still another aspect, the present embodiments may provide a data-driving circuit for driving a display panel in which a plurality of data lines and a plurality of touch electrodes are disposed.

The data-driving circuit may include: a Digital-to-Analog Converter (DAC) configured to convert digital image data into an analog voltage and to output the analog voltage, using input gamma voltages; and an output buffer configured to output a data signal to the data lines based on the analog voltage.

The data signal may be output while the touch electrodes are driven and may have a voltage changed by an amplitude of a touch-driving signal during a high-level period of the touch-driving signal.

In accordance with yet another aspect, the present embodiments may provide a driving circuit for driving a display panel in which a plurality of data lines and a plurality of touch electrodes are disposed.

The driving circuit may include: a data-driving circuit, configured to drive the plurality of data lines; and a touch-driving circuit, configured to drive the plurality of touch electrodes.

The touch-driving circuit may drive the plurality of touch electrodes while the plurality of data lines is driven.

The touch-driving circuit may output a touch-driving signal swinging with a predetermined amplitude in order to drive the touch electrodes.

The data-driving circuit may output a data signal having a voltage changed by the amplitude of the touch-driving signal during a high-level period of the touch-driving signal.

In accordance with still another aspect, the present embodiments may provide a gate-driving circuit for driving a display panel in which a plurality of gate lines and a plurality of touch electrodes are disposed.

The gate-driving circuit may include: a shift register, configured to generate a gate signal synchronized with a clock; a level shifter, configured to convert a signal voltage amplitude of the gate signal generated in the shift register; and an output buffer, configured to output the gate signal with the converted signal voltage amplitude.

The gate signal output from the output buffer may have a voltage changed by an amplitude of a touch-driving signal during a high-level period of the touch-driving signal for driving the touch electrodes.

As described above, the present embodiments may provide a touch display device, a method for driving the same, a driving circuit, a data-driving circuit, and a gate-driving circuit which enable high-speed image display and high-speed touch sensing.

Also, the present embodiments may provide a touch display device, a method for driving the same, a driving circuit, a data-driving circuit, and a gate-driving circuit which enable a display operation and a touch operation to be performed simultaneously.

Further, the present embodiments may provide a touch display device, a method for driving the same, a driving circuit, a data-driving circuit, and a gate-driving circuit which enable an image to be displayed normally without any change in the image, while performing a display operation and a touch operation simultaneously.

In addition, the present embodiments may provide a touch display device, a method for driving the same, a driving circuit, a data-driving circuit, and a gate-driving circuit which enable a display operation and a touch operation to be simultaneously performed when driving a high-resolution display.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
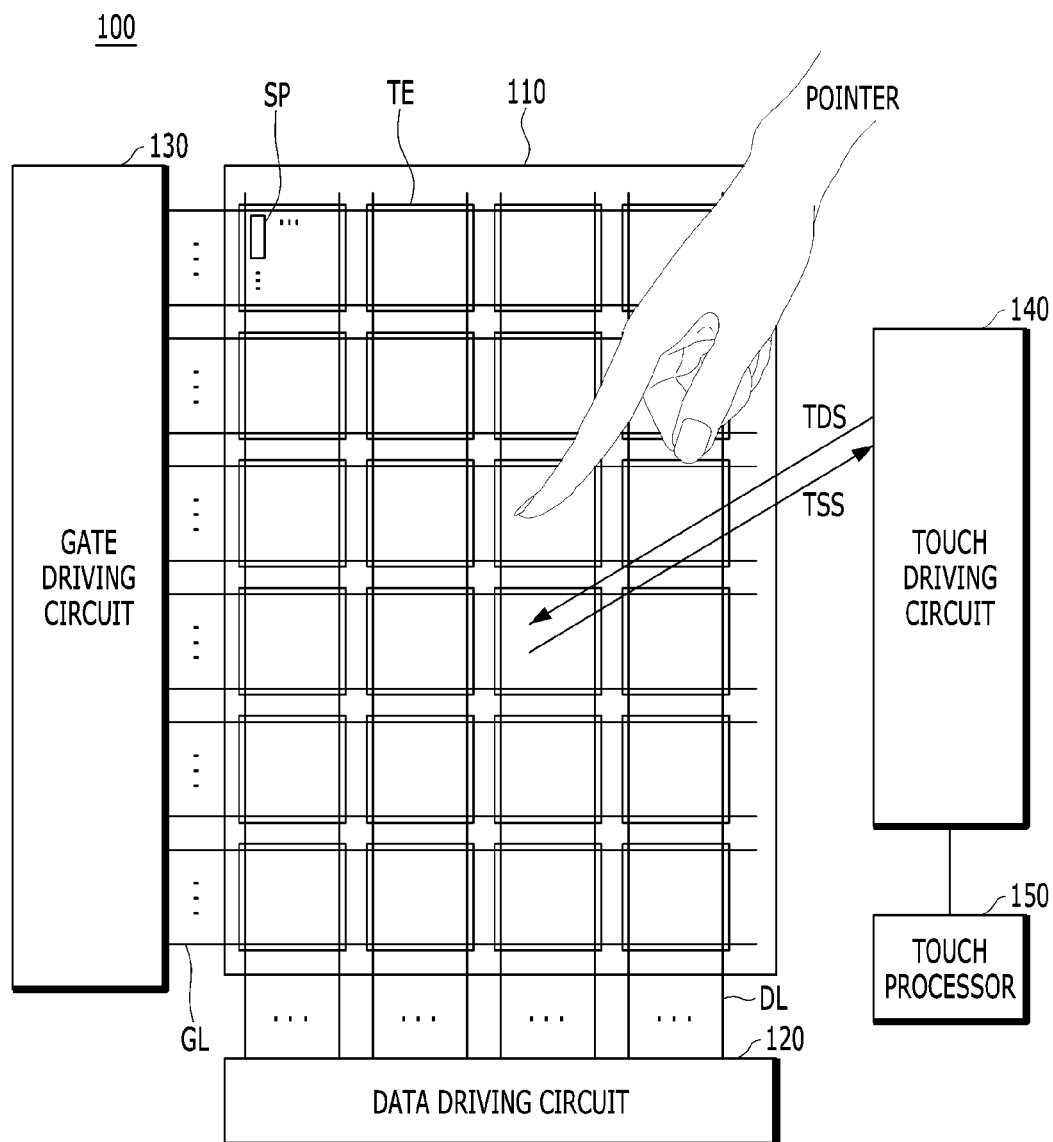
FIG. 1 illustrates a system configuration of a touch display device according to the present embodiments.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 illustrates a system configuration of a touch display device 100 according to the present embodiments.

Referring to FIG. 1, the touch display device 100 according to the present embodiments may include a display panel 110, in which a touch screen panel (TSP) is embedded, and various types of circuits.

The touch display device 100 according to the present embodiments may perform a display function of displaying an image and a touch function of sensing a touch made with a pointer, such as a finger or a pen.

The touch display device 100 according to the present embodiments performs the display function and the touch function simultaneously, instead of performing the display function and the touch function at different times.

That is, in the touch display device 100 according to the present embodiments, a display period for performing the display function may overlap or coincide with a touch period for performing the touch function.

In the display panel 110 according to the present embodiments, a plurality of data lines (DL) and a plurality of gate lines (GL) for the display function are disposed, and a plurality of sub-pixels (SP), defined by the plurality of data lines (DL) and the plurality of gate lines (GL), may be arranged.

Further, the display panel 110 according to the present embodiments also serves as a TSP and may include a plurality of touch electrodes (TE) disposed to serve as a touch sensor.

In this sense, the display panel 110 according to the present embodiments is understood to include the TSP and is also referred to as a "touch-screen-embedded display panel."

Referring to FIG. 1, the touch display device 100 includes, for the display function, a data driving circuit 120 to output a data signal for driving the plurality of data lines (DL) arranged in the display panel 110 and a gate driving circuit 130 to output a gate signal for driving the plurality of gate lines (GL) arranged in the display panel 110.

The touch display device 100 may further include at least one controller to control operation timing or power supply of the data-driving circuit 120 and the gate driving circuit 130.

Referring to FIG. 1, to perform the touch function, the touch display device 100 may include a touch driving circuit 140 to drive the plurality of touch electrodes (TE) embedded in a display panel 110 and a touch processor 150 to determine the occurrence of a touch and/or the position of a touch based on a signal (TSS) received from a driven touch electrode (TE).

The touch-driving circuit 140 may supply a touch driving signal (TDS) to the plurality of touch electrodes (TE) in order to drive the plurality of touch electrodes (TE).

The touch-driving circuit 140 may receive a Touch-Sensing Signal (TSS) from each touch electrode (TE) supplied with the Touch-Driving signal (TDS).

The TDS transmits the received TSS or sensing data obtained by processing the TSS to the touch processor 150.

The touch processor 150 may execute a touch algorithm using the TSS or the sensing data and may determine the occurrence of a touch and/or the position of a touch.

As described above, the touch display device 100 according to the present embodiments may employ a self-capacitance touch-sensing mode, which detects the occurrence of a touch and/or the position of a touch by detecting a change in capacitance between each touch electrode (TE) and a pointer.

That is, in the touch display device 100 according to the present embodiment, a TDS is applied to each touch electrode (TE) and a TSS is detected from each touch electrode (TE).

The touch display device 100 according to the present embodiments may also employ a mutual-capacitance touch-sensing mode, in which a plurality of touch electrodes (TE) is classified into a driving electrode (also referred to as a Tx electrode) and a sensing electrode (also referred to as an Rx electrode) and a change in capacitance between the driving electrode and the sensing electrode is detected by applying a TDS to the driving electrode and by receiving a TSS by the sensing electrode, thereby detecting the occurrence of a touch and/or the position of a touch.

However, for the convenience of description, it is assumed in the following description that the touch display device employs the self-capacitance touch-sensing mode.

In the self-capacitance touch-sensing mode, an electrode (referred to as a driving electrode or Tx electrode) to which a TDS is applied to drive a touch and an electrode (referred to as a sensing electrode or Rx electrode) from which a TSS is detected do not need to be disposed separately in the touch-screen-embedded display panel 110 according to the present embodiments, thus facilitating a process for the panel.

The data-driving circuit 120, the gate-driving circuit 130, the touch-driving circuit 140, and the touch processor 150 described above are classified according to functions thereof, and may be separately configured. If necessary, two or more of the data-driving circuit 120, the gate-driving circuit 130, the touch-driving circuit 140, and the touch processor 150 may be integrated into a single circuit.

In the present embodiments, one touch electrode (TE) may be larger in size than one sub-pixel SP. That is, one touch electrode (TE) may have a size that is equal to or greater than the size of an area occupied by a plurality of sub-pixels (SP).

For example, one touch electrode (1B, unit touch electrode) may have a size several times to several hundred times larger than that of one sub-pixel (SP).

The ratio between the size of the touch electrode and the size of the sub-pixel may be adjusted in view of touch-sensing efficiency and performance or in view of the impact of touch sensing on display overall.

Further, in the present embodiments, one touch electrode TE may be one whole electrode (bulk electrode).

One whole electrode corresponding to one touch electrode (TE) may be a plate electrode having no opening therein or may be an electrode having at least one opening therein.

Alternatively, one touch electrode (TE) may be formed of a plurality of sub-electrodes arranged in a mesh form and electrically connected.

Alternatively, one touch electrode (TE) may be formed of a plurality of sub-electrodes arranged in a line form and electrically connected.

As described above, the touch electrodes (TE) may be designed in various shapes and sizes. Each of the touch electrodes (TE) illustrated in FIG. 1 may be understood as a unit area for a touch operation and touch sensing.

Meanwhile, the touch display device 100 according to the present embodiments may be various types of display devices, such as a liquid crystal display device and an organic light-emitting display device, in terms of display function.

When the touch display device 100 according to the present embodiments is a liquid crystal display device, the plurality of touch electrodes (TE) may serve as a common electrode to which a common voltage (VCOM) is applied.

Since the touch display device 100 according to the present embodiments performs the display function and the touch function at the same time, a TDS applied to the plurality of touch electrodes (1B) for touch sensing also serves as a common voltage (VCOM) for the display function.

Accordingly, the touch display device 100 according to the present embodiments simultaneously drives the plurality of touch electrodes (TE). That is, a TDS is applied to all of the touch electrodes (TE).

However, the touch processor 150 detects the occurrence of a touch and/or the coordinates of a touch by individually using a TSS received from each touch electrode (TE).

As described above, since the touch display device 100 according to the present embodiments performs the display function and the touch function simultaneously, a TDS applied to all of the plurality of touch electrodes (TE) serves as a common voltage (VCOM) to form liquid crystal capacitance (Clc) together with a pixel voltage (data voltages) applied to a pixel electrode of the plurality of sub-pixels (SP).

As described above, when the plurality of touch electrodes (TE) also serves as a common electrode to which the common voltage (VCOM) is commonly applied, the plurality of touch electrodes (1E) may be electrically connected inside or outside of the touch-driving circuit 140.

Figure 2:
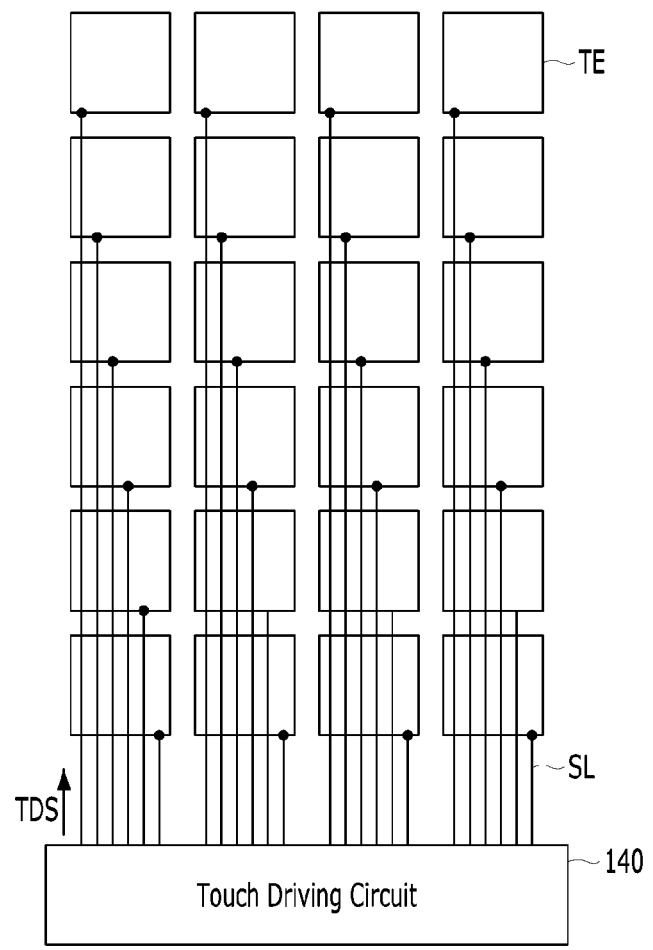
FIG. 2 illustrates a plurality of touch electrodes and signal lines disposed in a display panel of a touch display device according to the present embodiments.

FIG. 2 illustrates a plurality of touch electrodes (TE) and signal lines (SL) disposed in a display panel 110 of a touch display device 100 according to the present embodiments. Here, FIG. 2 illustrates a self-capacitance touch-sensing structure.

Referring to FIG. 2, a plurality of signal lines (SL) for electrically connecting the plurality of touch electrodes (TE) and a touch-driving circuit 140 may be disposed in the display panel 110.

In the self-capacitance touch-sensing structure, the plurality of touch electrodes (TE) does not overlap each other and is not electrically connected within the display panel 110.

Further, the plurality of signal lines (SL) does not overlap each other and is not electrically connected within the display panel 110.

Figure 3:
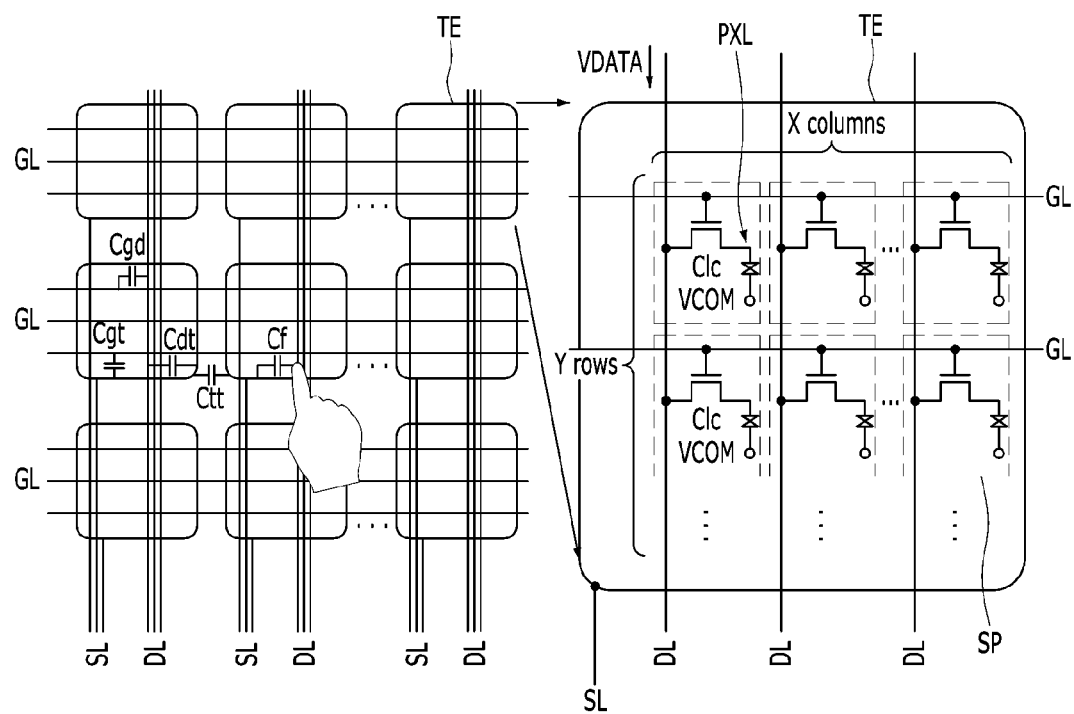
FIG. 3 illustrates a display panel of a touch display device according to the present embodiments.

FIG. 3 illustrates a display panel 110 of a touch display device 100 according to the present embodiments.

Referring to FIG. 3, one touch electrode (TE) is formed to correspond to an area of X*Y sub-pixels (SP).

As described above, the touch display device 100 according to the present embodiments performs a display function for image display and a touch function for touch sensing.

That is, the touch display device 100 according to the present embodiments simultaneously conducts a display operation for image display and a touch operation for touch sensing.

The touch display device 100 drives a data line (DL), a gate line (GL), and a display-related electrode, such as a common electrode, when performing a display operation.

In the touch display device 100, a plurality of touch electrodes (TE) may be a common electrode to form liquid crystal capacitance (Clc) together with a pixel electrode (PXL).

As described above, the touch electrode (TE) serving as a touch sensor is also used as a common electrode to which a common voltage (VCOM) needed for a display operation is applied, thereby simplifying a panel-manufacturing process, reducing the thickness of the panel, and enabling efficient manufacture of the touch-screen-embedded display panel 110.

To display an image, a color expressed in a sub-pixel (SP) is determined based on liquid crystal capacitance (Clc), which is the capacitance between the touch electrode (T E) and the pixel electrode (PXL).

A color expressed in a sub-pixel (SP) is determined based on a voltage difference (=VDATA-VCOM=VDATA-TDS) between a data voltage (VDATA) supplied to a pixel electrode (PXL) of the sub-pixel (SP) through the data line (DL) and a common voltage (VCOM) corresponding to a TDS applied to the touch electrode (TE).

The data voltage (VDATA) supplied to the data line (DL) is transmitted to the pixel electrode (PXL) through a transistor (T R) in the connected sub-pixel (SP).

Here, in the transistor TR, a gate electrode is connected to the gate line (GL), a source electrode (or drain electrode) is connected to the data line (DL), and the drain electrode (or source electrode) is connected to the pixel electrode (PXL).

For touch sensing, a TDS is applied to the touch electrode (TE).

Since the touch operation and the display operation are simultaneously performed, the TDS, which also serves as a common voltage (VCOM), is applied to all of the touch electrodes (TE).

Accordingly, finger capacitance (Cf) is formed between the touch electrode TE disposed at a position where the user makes a touch and the user's pointer (for example, a finger and a pen).

Here, various parasitic capacitances (Cgd, Cgt, Cdt, and Ctt) may be formed in the display panel 110.

Parasitic capacitance Cgd may be formed between the gate line (GL) and the data line (DL); parasitic capacitance Cgt may be formed between the gate line (GL) and the touch electrode (TE); parasitic capacitance Cdt may be formed between the data line (DL) and the touch electrode (TE); and parasitic capacitance Ctt may be formed between two adjacent touch electrodes (TE).

Since the TDS is applied to all the touch electrodes (TE), no parasitic capacitance (Ctt) may be formed between two adjacent touch electrodes (TE).

These various parasitic capacitances (Cgd, Cgt, Cdt and Ctt) may increase a resistor-capacitor load (RC load) and may affect the finger capacitance (Cf) formed between the touch electrodes (IB) and the user's pointer (for example, a finger or a pen), thus reducing the accuracy of touch sensing.

Therefore, for touch sensing and image display, while the TDS, which also serves as a common voltage (VCOM), is applied to all the touch electrodes (TE), the TDS or a corresponding signal may also be applied to some or all of data lines (DL) and some or all of gate lines (GL).

Accordingly, for touch sensing and video display, it is possible to prevent unnecessary parasitic capacitances (Cgd, Cgt, Cdt, and Ctt) from being formed while the TDS, which also serves as a common voltage (VCOM), is applied to all the touch electrodes (TE), regardless of the position at which a touch is made or even if no touch is made at any position.

Hereinafter, in order to improve both image display performance and touch-sensing performance, an efficient method in which a touch display device 100 simultaneously performs a display operation for image display and a touch operation for touch sensing is described in detail.

Figure 4:
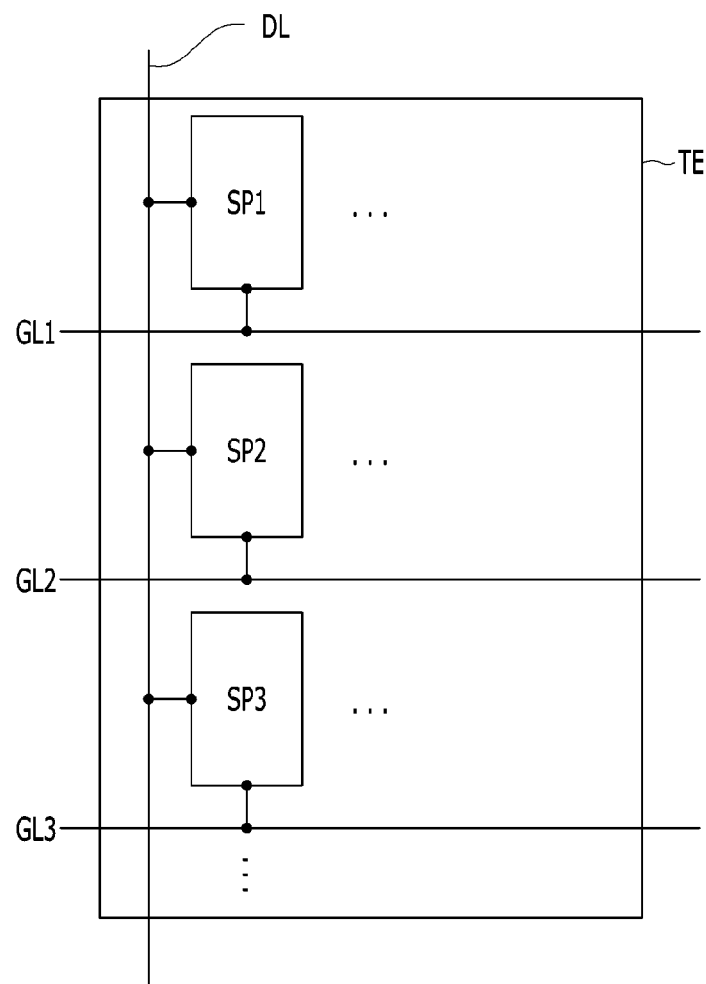
FIG. 4 illustrates one touch electrode and an area thereof in a display panel of a touch display device according to the present embodiments.

FIG. 4 illustrates one touch electrode (TE) and an area thereof in a display panel 110 of a touch display device 100 according to the present embodiments.

FIG. 4 shows one touch electrode (TE) and three sub-pixels (SP1, SP2, and SP3) among X*Y sub-pixels (SP) disposed in an area of the touch electrode in order to describe an efficient method in which the touch display device 100 simultaneously performs a display operation for image display and a touch operation for touch sensing.

Referring to FIG. 4, the three sub-pixels (SP1, SP2, and SP3) are connected to one data line (DL).

Accordingly, a sub-pixel SP1 is supplied with a data signal VDATA1 through the data line (DL). A sub-pixel SP2 is supplied with a data signal VDATA2 through the data line (DL). A sub-pixel SP3 is supplied with a data signal VDATA3 through the data line (DL).

Referring to FIG. 4, the three sub-pixels (SP1, SP2 and SP3) are connected to three gate lines (GL1, GL2 and GL3), respectively.

Accordingly, the sub-pixel SP1 is supplied with a gate signal through a gate line GL1. The sub-pixel SP2 is supplied with a gate signal through a gate line GL2. The sub-pixel SP3 is supplied with a gate signal through a gate line GL3.

Referring to FIG. 4, the one touch electrode (TE) is connected to one signal line (SL) and is supplied with a TDS.

Figure 5:
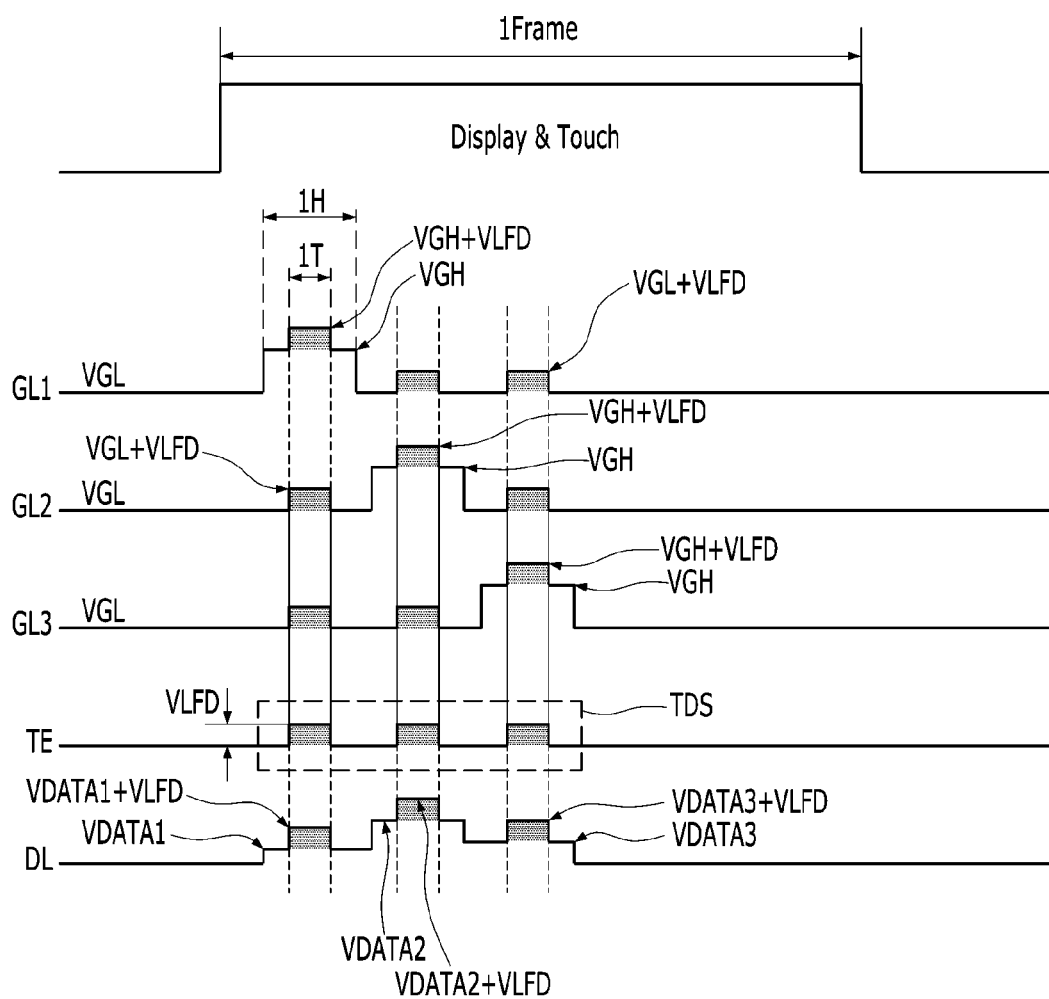
FIG. 5 is an operational timing diagram of a touch display device according to the present embodiments.

FIG. 5 is an operational timing diagram of a touch display device 100 according to the present embodiments.

Referring to FIG. 5, the touch display device 100 simultaneously performs a display operation for image display and a touch operation for touch sensing.

That is, the touch display device 100 may perform a touch operation for detecting the occurrence of a touch and/or the coordinates of a touch in the entire area of a screen one, two, or more times during the time of one frame in which a display operation for image display is performed.

Thus, a touch-driving circuit 140 may output a TDS to drive a plurality of touch electrodes (IB) while a plurality of data lines (DL) and a plurality of gate lines (GL) are driven, that is, during a display operation period.

The touch-driving circuit 140 may output a TDS that swings at a predetermined amplitude (VLFD).

Accordingly, the TDS may be a pulse signal having the predetermined amplitude (VLFD).

Here, a low-level voltage of the TDS may correspond to a DC voltage value of the common voltage (VCOM), and a high-level voltage of the TDS may be a voltage higher than the low-level voltage by the predetermined amplitude (VLFD).

Referring to FIG. 5, a gate-driving circuit 130 may output a gate signal having a voltage (VGL+VLFD or VGH+VLFD) changed (for example, increased) by the amplitude (VLFD) of the TDS during a high-level period (that is, a pulse generation period) of the TDS.

Referring to FIG. 5, a data-driving circuit 120 may output a data signal having a voltage (VDATA1+VLFD, VDATA2+VLFD, or VDATA3+VLFD) increased by the amplitude (VLFD) of the TDS during the high-level period (that is, the pulse generation period) of the TDS.

According to the above description, although the touch electrode (TE) serves as a touch sensor to which a TDS in the form of a pulse signal is applied, instead of a DC voltage, for touch sensing, and also serves as a common electrode needed for display operation, the data signal and the gate signal swing according to the amplitude (VLFD) of the TDS, thereby performing the display operation normally while a touch operation is performed.

Referring to FIG. 5, during the high-level period (1T) of the TDS, the gate-driving circuit 130 may output a gate signal having a voltage (VGH+VLFD) of a turn-on gate voltage (VGH) plus the amplitude (VLFD) of the TDS to a gate line (GL) corresponding to a turn-on time among the plurality of gate lines (GL).

During the high-level period (1T) of the TDS, the gate-driving circuit 130 may output a gate signal having a voltage (VGL+VLFD) of a turn-off gate voltage (VGL) plus the amplitude (VLFD) of the TDS to a gate line (GL) corresponding to a turn-off time among the plurality of gate lines (GL).

For example, when a gate line GL1 corresponds to the turn-on time and gate lines GL2 and GL3 correspond to the turn-off time, a gate signal having a voltage (VGH+VLFD) of the turn-on gate voltage (VGH) plus the amplitude (VLFD) of the TDS is applied to the gate line GL1 during the high-level period (1T) of the TDS applied to the touch electrode (TE). Here, a gate signal having a voltage (VGL+VLFD) of the turn-off gate voltage (VGL) plus the amplitude (VLFD) of the TDS may be applied to the gate lines GL2 and GL3.

Accordingly, a voltage difference between the TDS and the gate signal output to the gate line (GL) corresponding to the turn-on time among the gate lines (GL) during the high-level period (1T) of the TDS is the turn-on gate voltage (VGH), and a voltage difference between the TDS and the gate signal output to the gate line (GL) corresponding to the turn-off time among the gate lines (GL) is the turn-off gate voltage (VGL).

As described above, by increasing the gate signal by the amplitude (VLFD) of the TDS, a voltage difference between the gate line (GL) and the touch electrode (TE) may be eliminated, thus preventing parasitic capacitance (Cgt) from being formed between the gate line (GL) and the touch electrode (TE) and enabling a gate operation for image display to be performed normally.

Meanwhile, the high-level period (1T) of the TDS may be equal to or shorter than one horizontal duration (1H), that is, a period during which a voltage to turn on a transistor of a corresponding sub-pixel is to be applied.

In another aspect, the gate-driving circuit 130 may output a plurality of pulses to one gate line during a period of one frame.

For example, referring to FIG. 5, during a period of one frame, one pulse with a high-level voltage of VGH+VLFD and two pulses with a high-level voltage of VGL+VLFD are output to the gate line GL1.

Here, the one pulse with the high-level voltage of VGH+VLFD is a gate pulse for actually turning on the gate line GL1.

That is, among a plurality of pulses applied to one gate line during a period of one frame, one pulse has a voltage (VGH+VLFD) of the turn-on gate voltage (VGH) plus the amplitude (VLFD) of the TDS, and the other pulses have a voltage (VGL+VLFD) of the turn-off gate voltage (VGL) plus the amplitude (VLFD) of the TDS.

Referring to FIG. 5, the data-driving circuit 120 may output a data signal having a voltage (VDATA1+VLFD, VDATA2+VLFD, or VDATA3+VLFD) of a data voltage (VDATA1, VDATA2, or VDATA3) corresponding to input digital image data plus the amplitude VLFD of the TDS during the high-level period (1T) of the TDS.

For example, when a data voltage, obtained when digital image data to be supplied to the sub-pixel SP1 of FIG. 4 is directly changed into an analog voltage, is VDATA1, a data signal actually supplied to the sub-pixel SP1 is VDATA1+VLFD according to the present embodiments.

Likewise, when a data voltage, obtained when digital image data to be supplied to the sub-pixel SP2 of FIG. 4 is directly changed into an analog voltage, is VDATA2, a data signal actually supplied to the sub-pixel SP2 is VDATA2+VLFD according to the present embodiments.

When a data voltage obtained when digital image data to be supplied to the sub-pixel SP3 of FIG. 4 is directly changed into an analog voltage is VDATA3, the data signal actually supplied to the sub-pixel SP3 is VDATA3+VLFD according to the present embodiments.

According to the above description, a voltage difference between the data signal (VDATA1+VLFD, VDATA2+ VLFD, or VDATA3+VLFD) and the voltage (VLFD) of the TDS during the high-level period (1T) of the TDS may correspond to the original data voltage (VDATA1, VDATA2, or VDATA3) for image display.

As described above, by increasing the data signal by the amplitude (VLFD) of the TDS, the voltage difference between the data line (DL) and the touch electrode (TE) may be eliminated, thus preventing parasitic capacitance (Cdt) from being formed between the data line (DL) and the touch electrode (TE) and enabling a data operation for image display to be performed normally.

In the case of performing an operation according to the operational timing shown in FIG. 5, no image difference due to the display operation occurs, even during touch sensing.

The foregoing operation is described again with reference to the following equations.

When the touch electrode (TE) pulses by the amplitude (VLFD) to perform touch sensing during one horizontal time (1H), the gate line (GL) and the data line (DL) also pulse by the amplitude (VLFD).

As such, pulsing of the gate line (GL), the data line (DL), another touch electrode (TE) not performing sensing, or other neighboring electrodes by the amplitude (VLFD) is referred to as Load-Free Driving (LFD).

Here, a change in the amount of electric charges charged corresponding to liquid crystal capacitance (Clc) is expressed by Equation 1 below.

$$Qlc1 = Clc \times Vlc = Clc \times (\text{VDATA} - \text{VCOM})$$

$$Qlc2 = Clc \times Vlc = Clc \times [(\text{VDATA}+\text{VLFD})-(\text{VCOM}+\text{VLFD})] = Clc \times (\text{VDATA}-\text{VCOM}) \quad \text{[Equation 1]}$$

In Equation 1, Qlc1 denotes the amount of electric charges charged corresponding to liquid crystal capacitance (Clc) in the absence of LFD, and Qlc2 denotes the amount of electric charges charged corresponding to liquid crystal capacitance (Clc) in the presence of LFD.

In Equation 1, Clc denotes the liquid crystal capacitance between a pixel electrode (PXL) and a touch electrode (TE), as a common electrode, and Vlc denotes a potential difference between the opposite ends of the liquid crystal capacitance.

In Equation 1, VDATA denotes the voltage of a data signal applied to the pixel electrode (PXL), and VCOM denotes a common voltage, which corresponds to a low-level voltage of a TDS applied to the touch electrode (TE). VLFD corresponds to a high-level voltage of the TDS.

Equation 1 shows that the same amount of electric charges is charged regardless of whether no LFD is performed or LFD is performed to simultaneously perform a display operation and a touch operation.

Since the change in the amount of electric charges corresponding to the liquid crystal capacitance (Clc) leads to an image change, no change in the amount of electric charges means that there is no image change even though a touch operation and a display operation are simultaneously performed according to LFD.

Also, as shown in Equation 2, although a touch operation and a display operation are simultaneously performed according to LFD, there is no change in the electric charge amount of capacitance (Cgd) between the gate line (GL) and the data line (DL).

$$Qgd1 = Cgd \times Vgd \times Cgd \times (\text{VGATE}-\text{VDATA})$$

$$Qgd2 = Cgd \times Vgd = Cgd \times [(\text{VGATE}+\text{VLFD})-(\text{VDATA}+\text{VLFD})] = Cgd \times (\text{VGATA}-\text{VDATA}) \quad \text{[Equation 2]}$$

In Equation 2, Qgd1 denotes the amount of electric charges charged corresponding to the capacitance (Cgd) between the gate line (GL) and the data line (DL) in the absence of LFD, and Qlc2 denotes the amount of electric charges charged corresponding to the capacitance (Cgd) between the gate line (GL) and the data line (DL) in the presence of LFD.

In Equation 2, Cgd denotes the capacitance between the gate line (GL) and the data line (DL), and Vgd denotes a potential difference between the opposite ends of the capacitance between the gate line (GL) and the data line (DL).

In Equation 2, VGATE denotes the voltage of a gate signal applied to the gate line (GL), VDATA denotes the voltage of a data signal applied to the data line (DL), and VLFD corresponds to the high-level voltage of the TDS.

Equation 2 shows that the same amount of electric charges is charged regardless of whether no LFD is performed or LFD is performed to simultaneously perform a display operation and a touch operation.

When Cgd, Cgt, Cdt, Ctt, and Clc, shown in FIG. 3, are calculated using Equations 1 and 2, there is no change in the amount of electric charges even though LFD is performed to simultaneously perform a display operation and a touch operation.

When a user touches a specific touch electrode (TE) serving as a common electrode, finger capacitance (Cf) between a pointer, such as a finger, and the touch electrode (TE) is formed.

When LFD is performed to simultaneously perform a display operation and a touch operation, a change in the amount of electric charges charged corresponding to the finger capacitance (Cf) is as follows.

$$Q\text{finger1} = Cf \times Vtf = Cf \times (\text{VCOM}-V\text{finger})$$

$$Q\text{finger2} = Cf \times Vtf = Cf \times [(\text{VCOM}+\text{VLFD})-V\text{finger})]$$

$$\Delta Q\text{finger} = Cf \times Vtf = Cf \times \text{VLFD} \quad \text{[Equation 3]}$$

In Equation 3, Qfinger1 denotes the amount of electric charges charged corresponding to the finger capacitance (Cf) in the absence of LFD, and Qfinger2 denotes the amount of electric charges charged corresponding to the finger capacitance (Cf) in the presence of LFD.

In Equation 3, Cf denotes the finger capacitance between the pointer, such as a finger, and the touch electrode (TE), and Vtf denotes a potential difference between the pointer, such as a finger, and the touch electrode (TE).

In Equation 3, VCOM denotes a common voltage, which corresponds to a low-level voltage of a TDS applied to the touch electrode (TE). VLFD corresponds to a high-level voltage of the TDS. Vfinger corresponds to the voltage of the pointer, such as a finger.

According to Equation 3, a change in the amount of electric charges ($\Delta Q$finger) may be determined according to the high-level voltage (VLFD) of the TDS and the finger capacitance (Cf).

Figure 6:
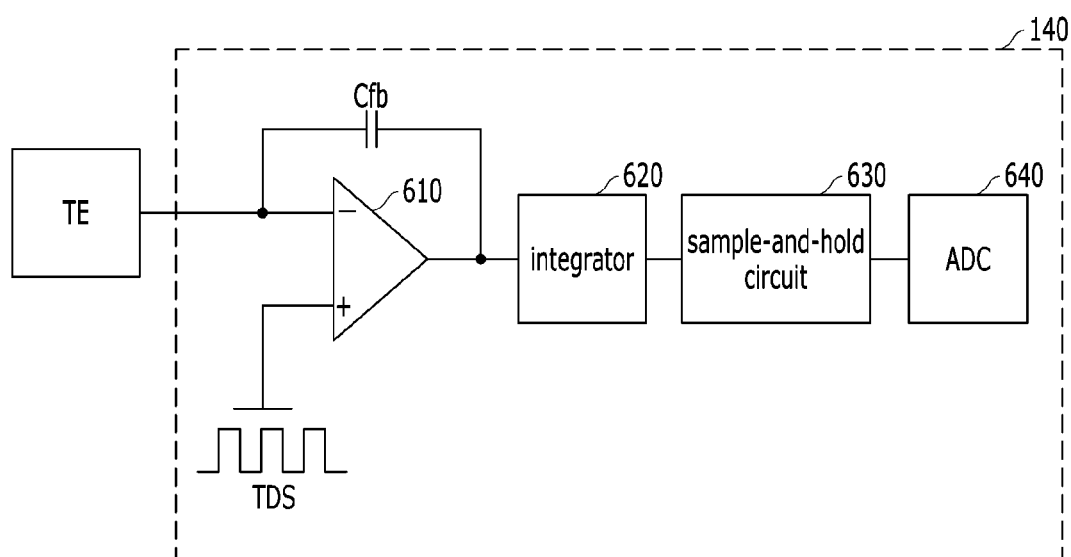
FIG. 6 illustrates a touch-driving circuit of a touch display device according to the present embodiments.

FIG. 6 illustrates a touch-driving circuit 140 of a touch display device 100 according to the present embodiments.

Referring to FIG. 6, the touch-driving circuit 140 may include an amplifier 610, an integrator 620, a sample-and-hold circuit 630, and an analog-to-digital converter (ADC) 640.

The amplifier 610 outputs a TDS input from a positive terminal to a negative terminal.

The TDS output to the negative terminal of the amplifier 610 is applied to a touch electrode (TE) disposed in a display panel 110.

When the TDS is applied to the touch electrode (TE), finger capacitance (Cf) is formed on the touch electrode (TE) in response to the occurrence of a touch.

As the finger capacitance Cf is formed, a signal (TSS) is input as a TDS through the touch electrode (TE), and electric charges are charged corresponding to feedback capacitance (Cfb) connected to the negative terminal of the amplifier 610 and an output terminal. The amount of charged electric charges changes depending on a touch.

The integrator 620 integrates a signal output from the amplifier 610 a predetermined number of times and outputs the signal. The sample-and-hold circuit 630 samples and stores the signal output from the integrator 620.

The ADC 640 reads the signal stored by the sample-and-hold circuit 630, converts the signal into a digital sensing value, and outputs the sensing value to a touch processor 150.

The touch processor 150 calculates the occurrence of a touch and/or the coordinates of a touch based on sensing values.

Hereinafter, a structure in which a TDS, a data signal, a gate signal, and the like, described with reference to FIG. 5, are transmitted to a corresponding electrode or a wire will be described.

Figure 7:
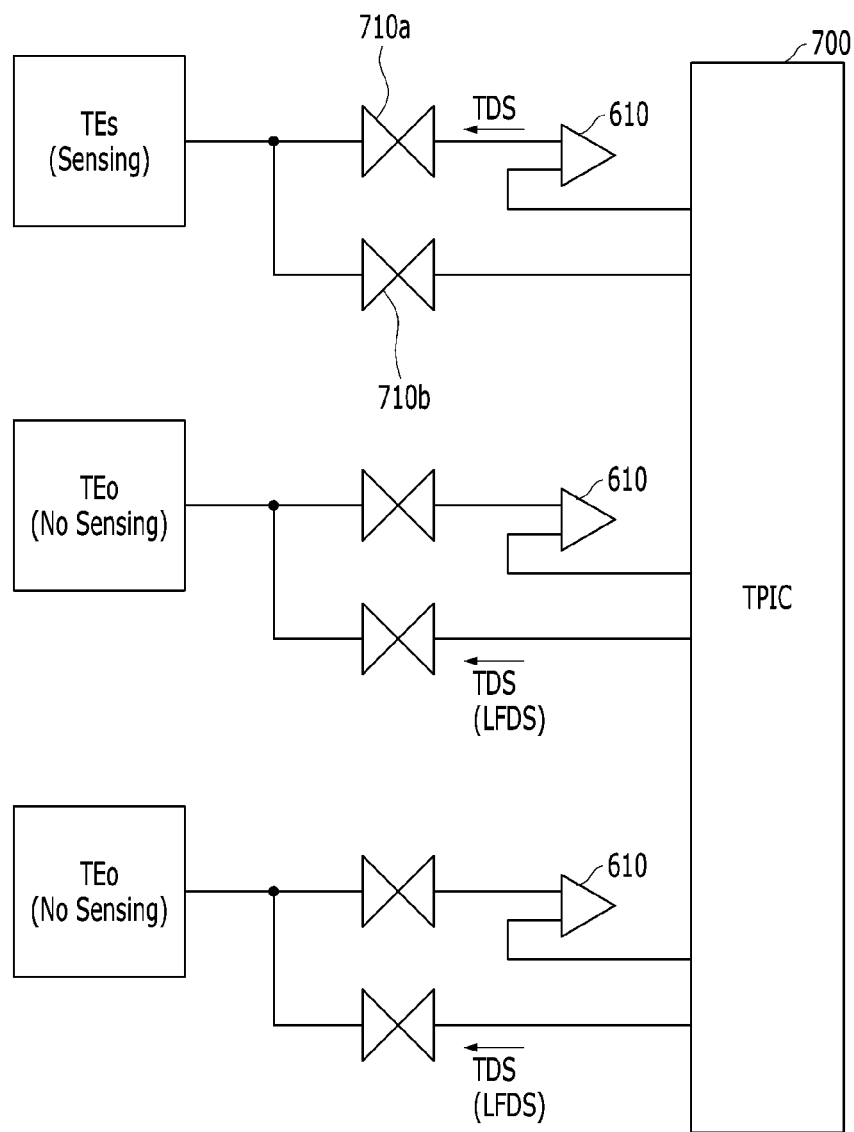
FIG. 7 illustrates a structure for transmitting a signal to a touch electrode in a touch display device according to the present embodiments.

FIG. 7 illustrates a structure for transmitting a signal to a touch electrode (T E) in a touch display device 100 according to the present embodiments.

Referring to FIG. 7, all touch electrodes (TE) are driven at the same time, among which, at a specific time, only some touch electrodes (TEs) are driven for touch sensing and the other touch electrodes (TEo) are driven to prevent the formation of parasitic capacitance (Ctt, Cgt, or Cdt).

Each of the touch electrodes (TEs and TEo) may be connected to both circuit components 710a and 610 for receiving a TDS for touch sensing and to a circuit component 710b for receiving a TDS to prevent the formation of parasitic capacitance (Ctt, Cgt, or Cdt).

A TDS for touch sensing is output from a touch power IC (TPIC) 700 and is applied to the touch electrodes (TEs) driven for touch sensing via the amplifier 610 and a first multiplexer 710a.

A TDS for preventing the formation of parasitic capacitance is output from the TPIC 700 and is applied to the touch electrodes (TEo) driven to prevent the formation of parasitic capacitance through a second multiplexer 710b.

Here, the TDS for preventing the formation of parasitic capacitance is also referred to as a Load-Free Driving Signal (LFDS).

Figure 8:
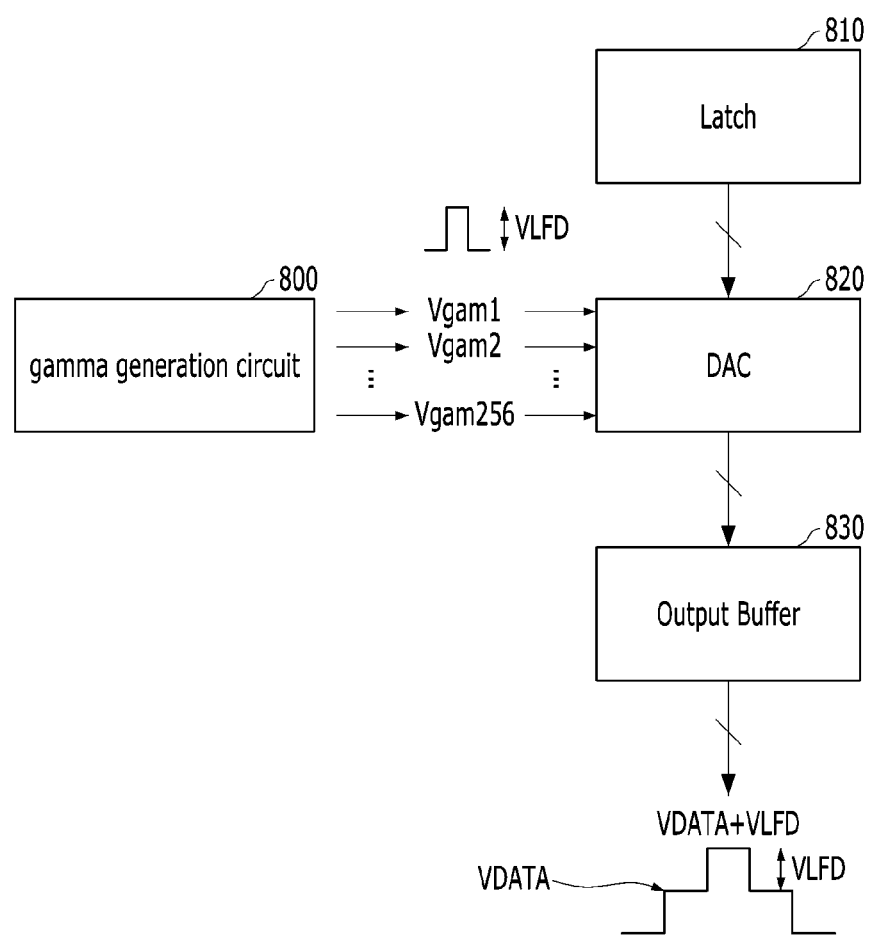
FIG. 8 illustrates a structure for transmitting a signal to a data-driving circuit and a data line of a touch display device according to the present embodiments.

FIG. 8 illustrates a structure for transmitting a signal to a data-driving circuit 120 and a data line (DL) of a touch display device 100 according to the present embodiments.

Referring to FIG. 8, the data-driving circuit 120 of the touch display device 100 according to the present embodiments includes one or more latches 810 to receive and store digital image data from a controller or the like, a digital-to-analog Converter (DAC) 820 to convert digital image data output from the latch 810 into an analog voltage and to output the analog voltage using input gamma voltages (Vgam1, Vgam2, . . . , and Vgam256), and an output buffer 830 to output a data signal to the data line (DL) on the basis of the analog voltage.

The data signal output from the output buffer 830 to the data line (DL) is output while a touch electrode (T E) is driven and has a voltage increased by the amplitude (VLFD) of a TDS during a high-level period (1T) of the TDS.

As described above, by increasing the data signal by the amplitude (VLFD) of the TDS, the voltage difference between the data line (DL) and the touch electrode (TE) may be eliminated, thus preventing parasitic capacitance (Cdt) from being formed between the data line (DL) and the touch electrode (TE) and enabling a data operation for image display to be performed normally.

Referring to FIG. 8, the gamma voltages (Vgam1, Vgam2, . . . , and Vgam256) may swing according to the amplitude (VLFD) of the TDS.

Accordingly, the analog voltage output from the DAC 820 and the data signal output from the output buffer 830 may also swing according to the gamma voltages (Vgam1, Vgam2, . . . , and Vgam256).

As such, as the gamma voltages (Vgam1, Vgam2, Vgam256) used for the generation of the data signal swing in accordance with the swing of the TDS, the data signal outputted from the data-driving circuit 120 also swings in accordance with the swing of the TDS.

Accordingly, a voltage difference between the data line (DL) and the touch electrode (TE) may be eliminated, thus preventing the formation of parasitic capacitance (Cdt) between the data line (DL) and the touch electrode (TE).

The gamma voltages (Vgam1, Vgam2, . . . , and Vgam256) swinging with the amplitude (VLFD) of the TDS may be generated and output from a gamma generation circuit 800.

The gamma generation circuit 800 may be included in the data-driving circuit 120, or may be disposed outside the data-driving circuit 120.

The above-mentioned gamma voltages are also referred to as a gamma reference voltage or a gamma reference.

Two examples of the gamma generator circuit 800 are described below.

Figure 9:
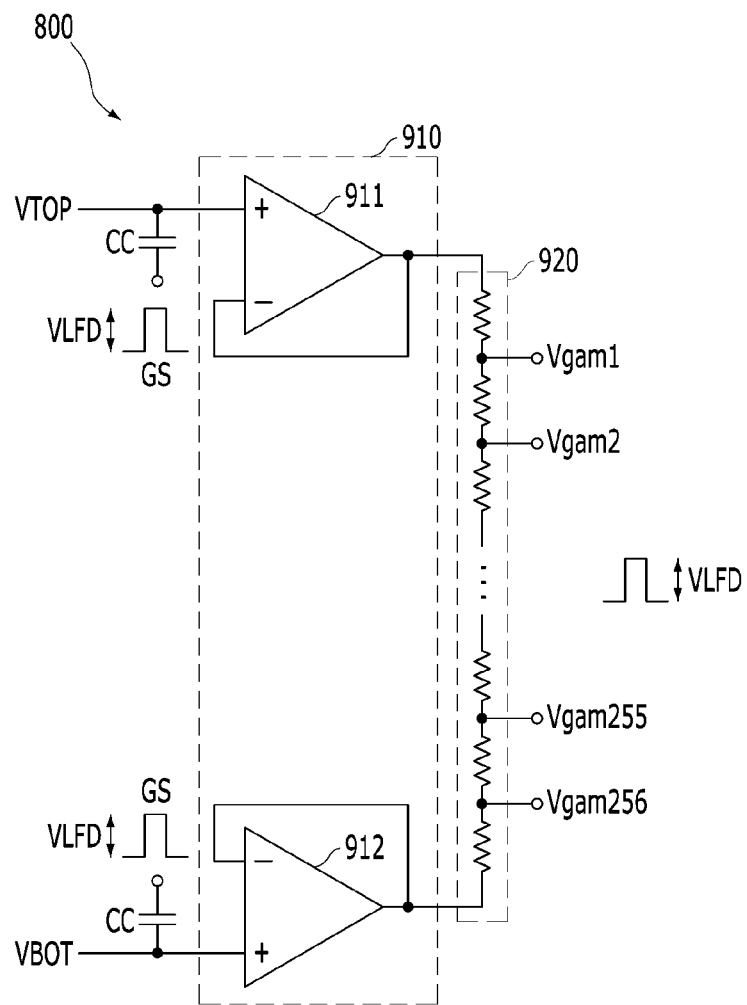
FIG. 9 illustrates an example of a gamma structure for transmitting a signal to a data line in a touch display device according to the present embodiments.

FIG. 9 illustrates an example of a gamma structure for transmitting a signal to a data line (DL) in a touch display device 100 according to the present embodiments.

Referring to FIG. 9, a gamma generation circuit 800 may include a first-stage amplifier circuit 910 and a first-stage resistor string 920.

The first-stage amplifier circuit 910 may include: an upper amplifier 911 having an input node to which an upper DC voltage (VTOP) is input, coupled with a signal (GS) swinging with the amplitude (VLFD) of the TDS, through a capacitor (CC); and a lower amplifier 912 having an input node to which a lower DC voltage (VBOT) is input, coupled with a signal (GS) swinging with the amplitude (VLFD) of the TDS through the capacitor (CC).

A signal input to a positive input terminal of the upper amplifier 911 is a signal that is obtained by coupling the upper DC voltage (VTOP) with the signal (GS) swinging with the amplitude (VLFD) of the TDS and that swings with the amplitude (VLFD) of the TDS.

A signal input to a positive input terminal of the lower amplifier 912 is a signal that is obtained by coupling the lower DC voltage (VBOT) with the signal (GS) swinging with the amplitude (VLFD) of the TDS and that swings with the amplitude (VLFD) of the TDS.

The first-stage resistor string 920 may be connected to an output node of the upper amplifier 911 and an output node of the lower amplifier 912.

The gamma voltages (Vgam1, Vgam2, . . . , and Vgam256) may be output at resistor connection points in the first-stage resistor string 920.

Here, the gamma voltages (Vgam1, Vgam2, . . . , and Vgam256) swing with the amplitude (VLFD) of the TDS.

Using the gamma generation circuit 800 illustrated in FIG. 9, it is possible to generate gamma voltages (Vgam 1, Vgam 2, . . . , and Vgam 256) which swing in a manner similar or identical to that of the TDS, using only a simple circuit configuration.

Figure 10:
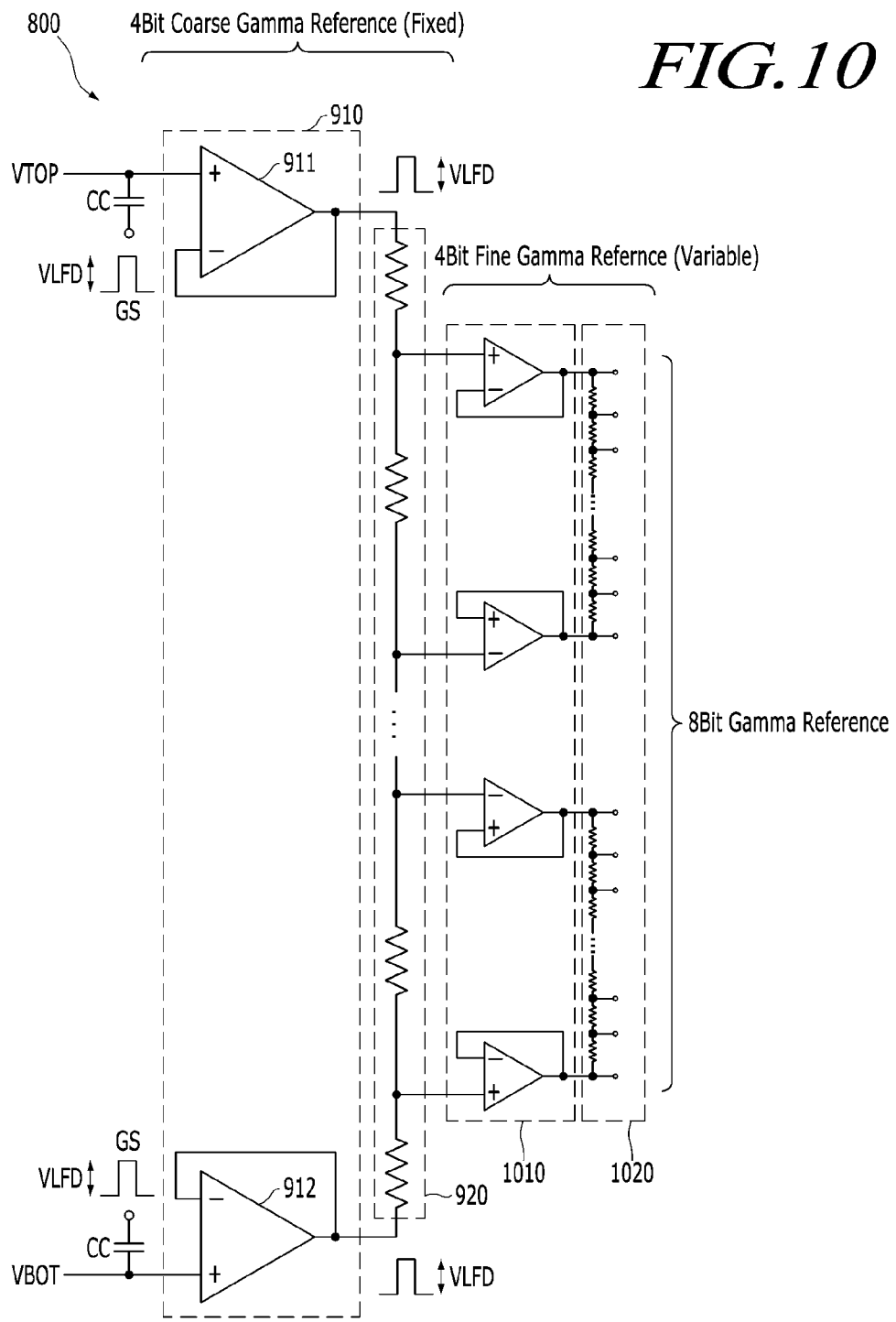
FIG. 10 illustrates another example of a gamma structure for transmitting a signal to a data line in a touch display device according to the present embodiments.

FIG. 10 illustrates another example of a gamma structure for transmitting a signal to a data line (DL) in a touch display device 100 according to the present embodiments.

Referring to FIG. 10, a gamma generation circuit 800 may include a first-stage amplifier circuit 910, a first-stage resistor string 920, a second-stage amplifier circuit 1010, and a second-stage resistor string 1020.

The first-stage amplifier circuit 910 may include: an upper amplifier 911 having an input node to which an upper DC voltage (VTOP) is input, coupled with a signal (GS) swinging with the amplitude (VLFD) of the TDS, through a capacitor (CC); and a lower amplifier 912 having an input node to which a lower DC voltage (VBOT) is input, coupled with a signal (GS) swinging with the amplitude (VLFD) of the TDS through the capacitor (CC).

A signal input to a positive input terminal of the upper amplifier 911 is a signal that is obtained by coupling the upper DC voltage (VTOP) with the signal (GS) swinging with the amplitude (VLFD) of the TDS and that swings with the amplitude (VLFD) of the TDS.

A signal input to a positive input terminal of the lower amplifier 912 is a signal obtained by coupling the lower DC voltage (VBOT) with the signal (GS) swinging with the amplitude (VLFD) of the TDS and that swings with the amplitude (VLFD) of the TDS.

The first-stage resistor string 920 may be connected to an output node of the upper amplifier 911 and an output node of the lower amplifier 912.

The second-stage amplifier circuit 1010 may include a plurality of amplifiers having an input node connected to resistor connection points in the first-stage resistor string 920.

The second-stage resistor string 1020 may be connected to output nodes of the amplifiers included in the second-stage amplifier circuit 1010.

Gamma voltages (Vgam1, Vgam2, . . . , and Vgam256) may be output at resistor connection points in the second-stage resistor string 1020.

Referring to FIG. 10, the first-stage amplifier circuit 910 and the first-stage resistor string 920 correspond to a coarse gamma generation part, and the second-stage amplifier circuit 1010 and the second-stage resistor string 1020 correspond to a fine gamma generation part.

The coarse gamma generation part generates a primary gamma voltage (gamma reference), and the fine gamma generation part generates a fine gamma voltage using the primary gamma voltage generated in the coarse gamma generation part, adjusting the gamma voltage by tuning a resistance value.

The coarse gamma generation part generates a 4-bit coarse gamma voltage (gamma reference).

The fine gamma generation part generates a 4-bit fine gamma voltage (gamma reference).

Accordingly, the finally outputted gamma voltages (Vgam1, . . . , and Vgam256) correspond to an 8-bit gamma reference.

The coarse gamma generation part generates an important portion of a gamma curve and outputs a fixed value. The fine gamma generation part outputs a variable value.

It is merely an example that the coarse gamma generation part generates the 4-bit coarse gamma voltage (gamma reference) and the fine gamma generation part generates the 4-bit fine gamma voltage (gamma reference). Instead, the generation parts may generate gamma voltages of different bits.

Using the gamma generation circuit 800 illustrated in FIG. 10, it is possible to precisely generate the gamma voltages (Vgam1, Vgam2, . . . , and Vgam256) swinging in a manner similar or identical to that of the TDS.

Figure 11:
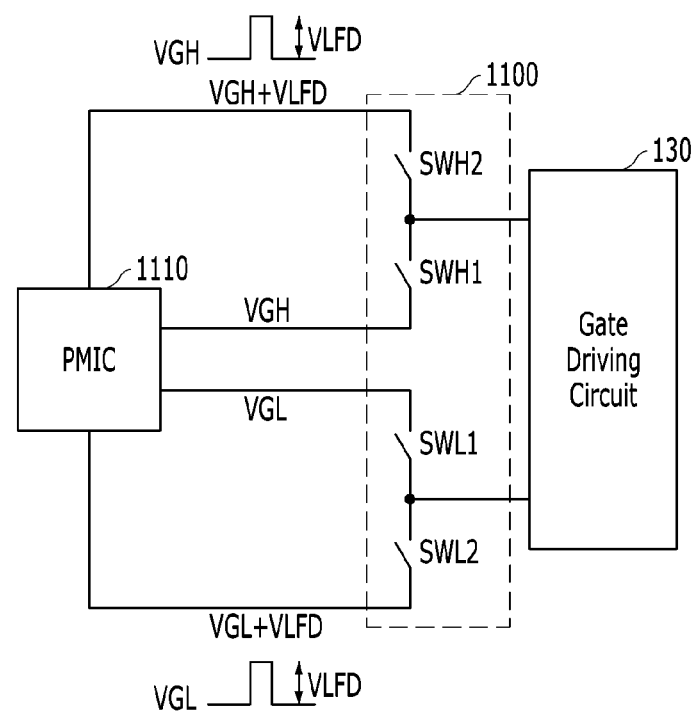
FIG. 11 illustrates a structure for transmitting a signal to a gate line of a touch display device according to the present embodiments.

FIG. 11 illustrates a structure for transmitting a signal to a gate line (GL) of a touch display device 100 according to the present embodiments.

Referring to FIG. 11, a gate-driving circuit 130 may output, through a switching circuit 1100, a gate signal based on one selected from among a turn-on gate voltage (VGH), a voltage of the turn-on gate voltage (VGH) plus the amplitude (VLFD) of a TDS, a turn-off gate voltage (VGL), and a voltage of the turn-off gate voltage (VGL) plus the amplitude (VLFD) of the TDS.

As described above, the gate-driving circuit 130 may generate a gate signal swinging in accordance with the swing of a TDS.

Referring to FIG. 11, the turn-on gate voltage (VGH), the voltage of the turn-on gate voltage (VGH) plus the amplitude (VLFD) of the TDS, the turn-off gate voltage (VGL), and the voltage of the turn-off gate voltage (VGL) plus the amplitude (VLFD) of the TDS may be supplied from a power management IC (PMIC) 1110.

The gate-driving circuit 130 may include a level shifter.

Further, the gate-driving circuit 130 may be configured as a gate-in-panel (GIP) type.

Hereinafter, a method for driving the foregoing touch display device 100 is briefly described.

Figure 12:
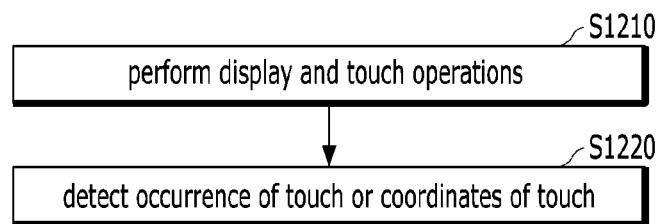
FIG. 12 is a flowchart illustrating a method for driving a touch display device according to the present embodiments.

FIG. 12 is a flowchart illustrating a method for driving a touch display device 100 according to the present embodiments.

Referring to FIG. 12, the touch display device 100 includes: a display panel 110 in which a plurality of data lines (DL), a plurality of gate lines (GL), and a plurality of touch electrodes (TE) are disposed; a gate-driving circuit 130 to drive the plurality of gate lines (GL); and a data-driving circuit 120 to drive the plurality of data lines (DL).

The method for driving the touch display device 100 may include outputting a TDS to drive the plurality of touch electrodes (TE) while the plurality of data lines (DL) and the plurality of gate lines (GL) are driven (S1210) and detecting the occurrence of a touch or the coordinates of a touch based on a signal received through each touch electrode (TE) (S1220).

In operation S1210, the TDS swings with a predetermined amplitude (VLFD).

Further, a gate signal to drive the gate lines (GL) swings in accordance with the swing of the TDS.

Accordingly, the gate signal to drive the gate lines (GL) has a voltage increased by the amplitude (VLFD) of the TDS during a high-level period (T1) of the TDS.

Further, a data signal to drive the data lines (DL) swings in accordance with the swing of the TDS.

Accordingly, the data signal to drive the data lines (DL) has a voltage increased by the amplitude (VLFD) of the TDS.

Using the driving method, although the touch electrode (TE) serves as a touch sensor to which a TDS in the form of a pulse signal is applied, instead of a DC voltage, for touch sensing, and also serves as a common electrode needed for a display operation, the data signal and the gate signal swing according to the amplitude (VLFD) of the TDS, whereby the display operation is performed normally while a touch operation is performed.

Figure 13:
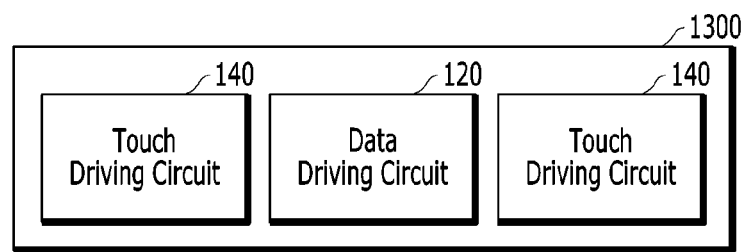
FIG. 13 illustrates a driving circuit according to the present embodiments.

FIG. 13 illustrates a driving circuit 1300 according to the present embodiments.

The data-driving circuit 120 and the touch-driving circuit 140 described above may be configured in one integrated circuit.

For example, as illustrated in FIG. 13, one data-driving circuit 120 and two touch-driving circuits 140 may be configured in one integrated circuit.

Referring to FIG. 13, the driving circuit 1300 to drive a display panel 110 in which a plurality of data lines (DL) and a plurality of touch electrodes (TE) are disposed may include a data-driving circuit 120 to drive the plurality of data lines (DL) and a touch-driving circuit 140 to drive the plurality of touch electrodes (TE).

The touch-driving circuit 140 may drive the plurality of touch electrodes (TE) while the plurality of data lines (DL) is driven.

The touch-driving circuit 140 may output a TDS swinging with a predetermined amplitude (VLFD) in order to drive the touch electrodes (TE).

The data-driving circuit 120 may output a data signal having a voltage increased by the amplitude (VLFD) of the TDS during a high-level period of the TDS.

As described above, both a data operation and a touch operation may be provided through the driving circuit 1300 configured as one integrated circuit. Further, using the driving circuit 1300, the data signal swings with the amplitude (VLFD) of the TDS, and thus a data operation for image display may be performed normally while a touch operation is performed.

Hereinafter, the foregoing gate-driving circuit 130 is briefly described.

Figure 14:
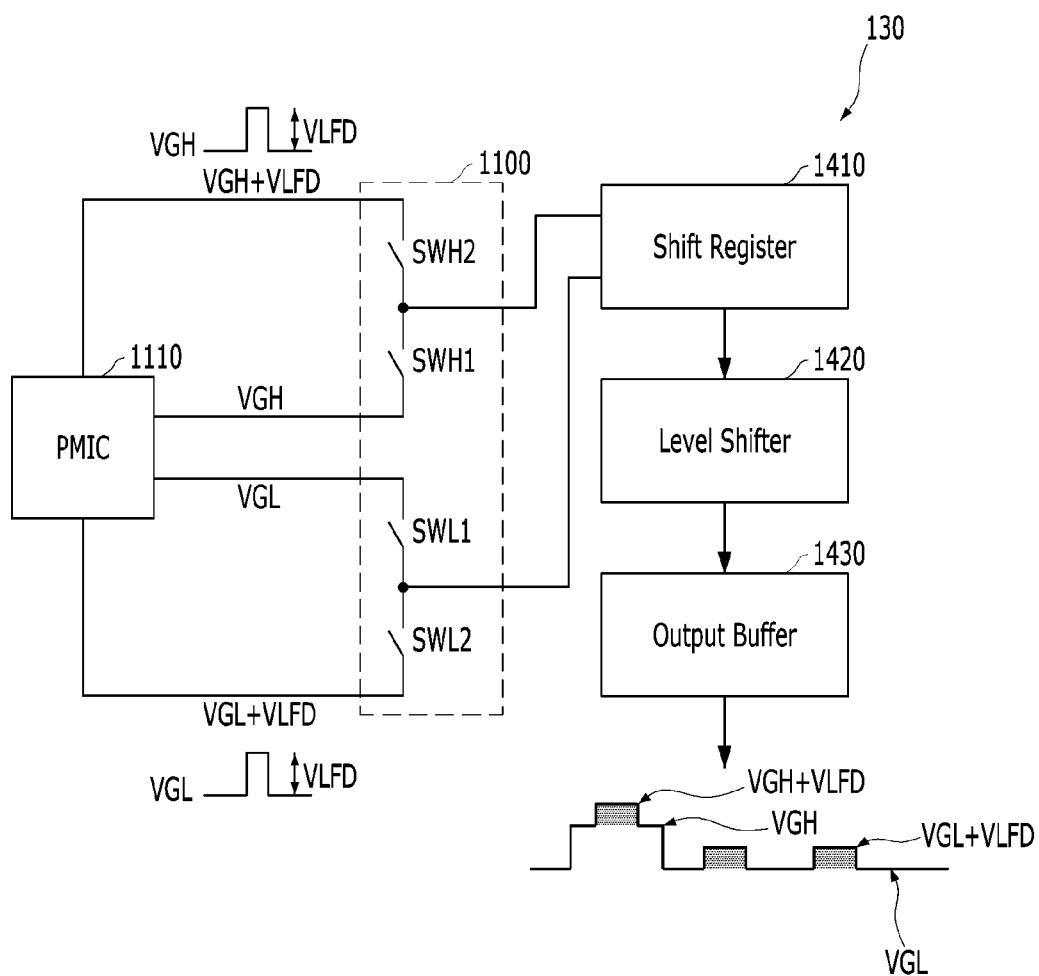
FIG. 14 illustrates a gate-driving circuit according to the present embodiments.

FIG. 14 illustrates a gate-driving circuit 130 according to the present embodiments.

Referring to FIG. 14, the gate-driving circuit 130 according to the present embodiments may include a shift register 1410 to generate a gate signal synchronized with a clock, a level shifter 1420 to convert the signal voltage amplitude of the gate signal generated in the shift register 1410 into a level for a gate operation, and an output buffer 1430 to output the gate signal with the converted signal voltage amplitude.

The gate signal output from the output buffer 1430 may have a voltage increased by the amplitude (VLFD) of a TDS during a high-level period (1T) of the TDS to drive a touch electrode (TE).

Using the gate-driving circuit 130, it is possible to generate and output a gate signal swinging according to a TDS. Accordingly, a voltage difference between a gate line (GL) and a touch electrode (TE) may be eliminated, thus preventing parasitic capacitance (Cgt) from being formed between the gate line (GL) and the touch electrode (TE) and enabling a gate operation for image display to be performed normally.

The gate-driving circuit 130 may further include a switching circuit 1100 that selects one of a turn-on gate voltage (VGH), a voltage (VGH+VLFD) of the turn-on gate voltage (VGH) plus the amplitude (VLFD) of a TDS, a turn-off gate voltage (VGL), and a voltage (VGL+VLFD) of the turn-off gate voltage (VGL) and the amplitude (VLFD) of the TDS, and supplies the selected voltage to the shift register 1410.

The switching circuit 1100 may include: a switch SWH1 to control the supply of the turn-on gate voltage (VGH) to the shift register 1410; a switch SWH2 to control the supply of the voltage (VGH+VLFD) of the turn-on gate voltage (VGH) plus the amplitude (VLFD) of the TDS to the shift register 1410; a switch SWL1 to control the supply of the turn-off gate voltage (VGL) to the shift register 1410; and a switch SWL2 to control the supply of the voltage (VGL+VLFD) of the turn-off gate voltage (VGL) and the amplitude (VLFD) of the TDS to the shift register 1410.

The turn-on gate voltage (VGH), the voltage (VGH+VLFD) of the turn-on gate voltage (VGH) plus the amplitude (VLFD) of the TDS, the turn-off gate voltage (VGL), and the voltage (VGL+VLFD) of the turn-off gate voltage (VGL) plus the amplitude (VLFD) of the TDS may be supplied from a PMIC 1110 to the switching circuit 1100.

Using the switching circuit 1100, it is possible to select the four voltages (VGH, VGH+VLFD, VGL, and VGL+VLFD) needed to generate a gate signal swinging according to a TDS as necessary. Accordingly, gate signals having the four voltages (VGH, VGH+VLFD, VGL, and VGL-FVLFD) may be generated.

As described above, the present embodiments may provide a touch display device 100, a method for driving the same, a driving circuit 1300, a data-driving circuit 120, and a gate-driving circuit 130 which enable high-speed image display and high-speed touch sensing.

Also, the present embodiments may provide a touch display device 100, a method for driving the same, a driving circuit 1300, a data-driving circuit 120, and a gate-driving circuit 130 which enable a display operation and a touch operation to be performed simultaneously.

Further, the present embodiments may provide a touch display device 100, a method for driving the same, a driving circuit 1300, a data-driving circuit 120, and a gate-driving circuit 130 which enable an image to be displayed normally without any change in the image, while performing a display operation and a touch operation simultaneously.

In addition, the present embodiments may provide a touch display device 100, a method for driving the same, a driving circuit 1300, a data-driving circuit 120, and a gate-driving circuit 130 which enable a display operation and a touch operation to be simultaneously performed when driving a high-resolution display.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A touch display device comprising:
    a display panel including a data line, a first gate line, a second gate line, a touch signal line, and a touch electrode connected to the touch signal line;
    a touch-driving circuit configured to provide a touch-driving signal to the touch signal line for sensing a touch, wherein the touch-driving signal swings with an amplitude between a first level and a second level greater than first level; and a gate-driving circuit configured to provide gate signals each having a turn-on gate voltage and a turn-off gate voltage, wherein the gate-driving circuit sequentially provides the gate signals of a third level to the first and second gate lines, wherein the gate-driving circuit provides a gate signal of a fourth level to the second gate line while the gate signal of the third level is provided to the first gate line, wherein the third level is a voltage at which a turn-on gate voltage is modulated by the amplitude of the touch-driving signal, and wherein the fourth level is a voltage at which a turn-off gate voltage is modulated by the amplitude of the touch-driving signal.

2. The touch display device of claim 1, wherein the gate-driving circuit is configured to provide another gate signal of the fourth level to the first gate line while the gate signal of the third level is provided to the second gate line.

3. The touch display device of claim 2, wherein the first and second gate lines transmit the gate signals of the third level and the gate signals of the fourth level while the touch-driving circuit provides the touch-driving signal to at least one touch signal line.

4. The touch display device of claim 1, wherein the data line and the first and second gate lines overlap the touch electrode.

5. The touch display device of claim 1, wherein the display panel further comprises:
a first sub-pixel connected to the first gate line; and
a second sub-pixel connected to the second gate line.

6. The touch display device of claim 5, wherein the data line is connected to the first and second sub-pixels.

7. The touch display device of claim 1, wherein the first and second sub-pixels overlap the touch electrode.

8. The touch display device of claim 1, wherein a period in which the touch-driving signal having the second level of amplitude is provided is greater than or equal to one horizontal period.

9. The touch display device of claim 1, wherein each of the gate signals includes a plurality of pulses, and during one-frame period, one pulse among the plurality of pulses has a voltage of a turn-on gate voltage plus the amplitude of the touch-driving signal, and remaining pulses among the plurality of pulses have a voltage of a turn-off gate voltage plus the amplitude of the touch-driving signal.

10. The touch display device of claim 1, wherein a period in which the touch-driving signal having the second level of amplitude is provided is less than or equal to one horizontal period.

11. The touch display device of claim 1, wherein the touch electrode is a common electrode forming a capacitor along with a pixel electrode.

12. The touch display device of claim 1, further comprising a data-driving circuit configured to drive the data line while the touch-driving circuit provides at least one touch-driving signal to at least one touch signal line.

13. The touch display device of claim 12, wherein the data-driving circuit outputs a data signal having a voltage corresponding to input digital image data plus a voltage corresponding to the amplitude of the touch-driving signal.

14. The touch display device of claim 13, wherein the data-driving circuit comprises:
a digital-to-analog converter (DAC) converting the input digital image data into an analog voltage and to output the analog voltage using gamma voltages; and
an output buffer outputting the data signal to a plurality of data lines based on the analog voltage, and wherein
the gamma voltages swing with the amplitude of the touch-driving signal, and
the analog voltage swings in accordance with the gamma voltages.

15. The touch display device of claim 14, further comprising a gamma generation circuit configured to generate the gamma voltages,
wherein the gamma generation circuit comprises:
a first-stage amplifier circuit comprising an upper amplifier having an input node to which an upper DC voltage is input, coupled with a signal swinging with the amplitude of the touch-driving signal, through a capacitor, and a lower amplifier having an input node to which a lower DC voltage is input, coupled with a signal swinging with the amplitude of the touch-driving signal through the capacitor; and
a first-stage resistor string configured to be connected to an output node of the upper amplifier and an output node of the lower amplifier and to have resistor connection points from which the gamma voltages are output.

16. The touch display device of claim 12, wherein the data-driving circuit and the touch-driving circuit are implemented in one integrated circuit.

17. The touch display device of claim 1, wherein the touch electrode overlaps the data line and the touch signal line.

* * * * *